United States Patent [19]

Senger

[11] 4,105,912
[45] Aug. 8, 1978

[54] RADAR VIEWING DEVICE

[75] Inventor: Hans-Jurgen Senger, Norderstedt, Fed. Rep. of Germany

[73] Assignee: Elna, GmbH, Rellingen, Fed. Rep. of Germany

[21] Appl. No.: 684,404

[22] Filed: May 11, 1976

[30] Foreign Application Priority Data

May 7, 1976 [DE] Fed. Rep. of Germany ....... 2520505

[51] Int. Cl.² .............................. 343 6 TV; H01J 31/26
[52] U.S. Cl. ........................................ 315/10; 358/73; 358/103; 343/5 CD
[58] Field of Search .................... 315/10, 375; 358/72, 358/73, 103, 168, 169, 211; 343/5 CD, 6 TV

[56] References Cited

U.S. PATENT DOCUMENTS 3,164,673  1/1965  Sharon .................................. 358/169
3,330,990  7/1967  Guillette .............................. 315/375

OTHER PUBLICATIONS

Martin, A. F., Electronics, Jan. 18, 1973, Penetration Color Tubes are Enhancing Information Displays.

Primary Examiner—Maynard R. Wilbur
Assistant Examiner—T. M. Blum
Attorney, Agent, or Firm—Andrus, Sceales, Starke & Sawall

[57] ABSTRACT

The viewing screen of a radar apparatus contains a pair of luminescent layers having green and red luminescing colors respectively. The color of the radar image may be altered by photosensitive means responsive to ambient light which alters the anode voltage of the electron beam gun so that the radar images are green during the day and orange during the night, thereby to avoid dazzling the viewer at night.

5 Claims, 3 Drawing Figures

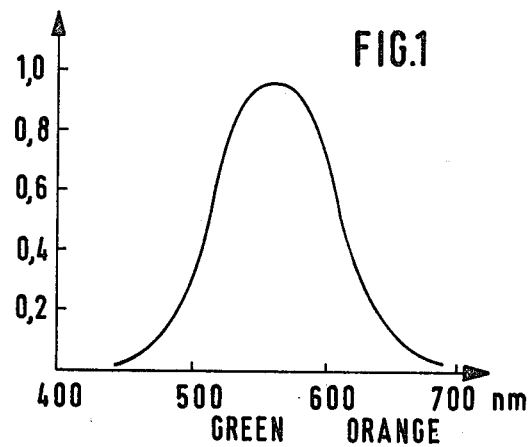
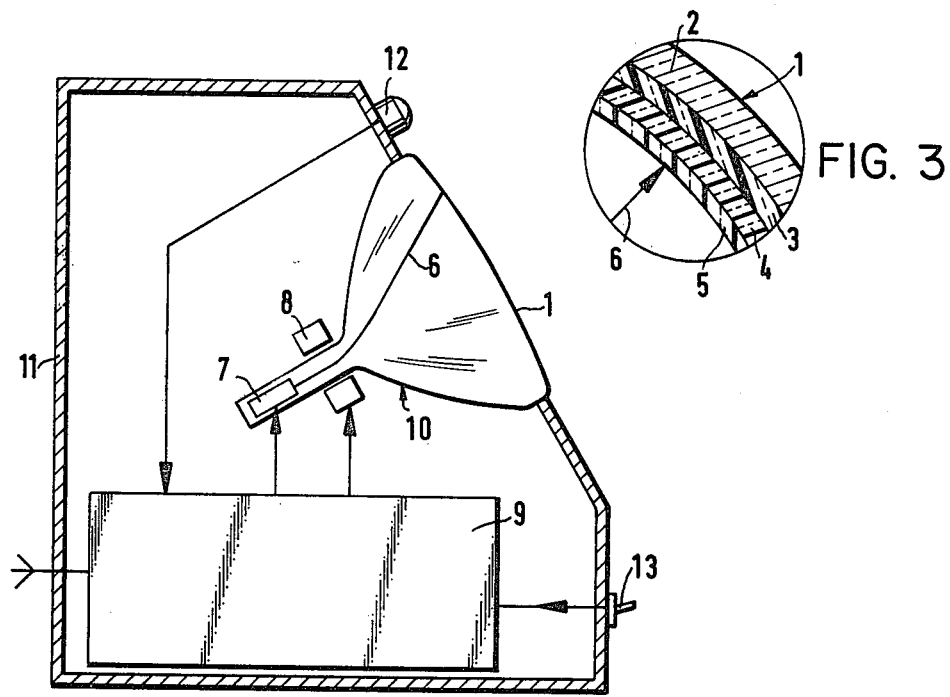

RADAR VIEWING DEVICE

BACKGROUND OF THE INVENTION

1. Field of the Invention

The invention relates to a radar viewing apparatus comprising a cathode ray tube including an afterglowing viewing screen, a deflection unit associated with the tube and an electronic constructional group for controlling the cathode ray tube electrodes and the deflection unit with at least the cathode ray tube and the deflection unit arranged in a common housing.

2. Description of the Prior Art

The cathode ray tube used for the representation of the picture in an important structural element for a radar system. It is on this tube that the user is to recognize as clearly as possible the radar targets and perhaps the measuring rings, thus enabling him to evaluate them as unambiguously and as safely as possible. The radar screens are mostly green or orange colour. Green radar screens are preferred aboard a ship while the orange-coloured radar screens are for a considerable part used in flight security or air traffic control services for example. In connection with flight security services the environmental brightness at the radar viewing screen does not change since a darkened room is used. On the bridge of a ship, however, the environmental brightness changes considerably with the transition from day to night. As the maximum of the sensitivity characteristic of the eye is at 555 NM (nonometer, i.e. $10^{-9}$ meters or millimicrons) the green radar screen has frequently been preferred up to now for the radar systems of ships. Particularly during dusk and dawn, however, the visual perception or sensitivity grows considerably less, but also with sudden transistions from bright to dark the visual perception or sensitivity is reduced. As in the case of night traffic the environmental brightness is missing, the green radar very much dazzles the viewer because in that case particularly strong transitions from bright to dark will occur when the viewer during a journey at night averts his look from the radar viewing apparatus and looks into the darkness. An optimum sensitivity is no longer given.

SUMMARY OF THE PRESENT INVENTION

It is therefore the object of the present invention to provide a radar viewing apparatus in which with a change in environmental brightness a change in the coloration of the radar image on the luminescent screen is possible. This object is obtained in that the cathode ray tube is a multicolour tube having several afterglowing luminescent layers of different luminescing behavior arranged on above the other, the anode voltage of said layers being changeable in response to the brightness of the environment of the luminescent screen.

Such multicoloured tubes having several luminescent layers of different luminescing behavior arranged one above the other are known. But they are being used at the same time for the simultaneous representation of different information in several colours. For these purposes the luminescent material layers used have an extremely short period of afterglow so that the tubes may be operated with very high repetition frequencies. Such mutlicoloured tubes are known to be used, for example, for the representation of information in the central control stations of electricity companies.

With the subject matter of the application, however, the same or a comparable information is represented in different yet unitary colorations respectively dependent upon the environmental brightness, in order to adapt the representation to the sensitiveness of the human eye which changes in response to the environmental brightness. For this purpose, the luminescent materials used for the multicoloured tube employed in accordance with the invention must have a greater period of afterglow of 1 to 5 sec. and more. Luminescent materials having such periods of afterglow are already available.

It is particularly advantageous if the radar image lights up green during the day and orange during the night.

If the change of the anode voltage takes place at a predetermined rate, steady adaptation to the sensitivity of the eye may be obtained also during dusk and dawn.

The electronic constructional group for the control of the cathode ray tube electrodes and the deflection unit may for this purpose be controlled by a photosensitive electronic constructional element arranged on the housing in the neighbourhood of the viewing screen and thus sensing the environmental brightness of the viewing screen.

Additional subclaims relate to the special embodiments of the radar viewing screen according to the invention.

BRIEF DESCRIPTION OF THE DRAWING

The invention will now be described in more detail by way of the accompanying drawings, in which, FIG. 1 shows the sensitivity characteristic of the eye in dependence upon the wavelength and FIG. 2 shows a schematic partial cross sectional view of the radar viewing apparatus.

FIG. 3 shows a detailed cross sectional view of the screen of the radar viewing apparatus.

DETAIL DESCRIPTION OF THE PREFERRED EMBODIMENT

FIG. 1 shows the wavelength of the radiation plotted in nanometers on the abscissa with the relative spectral sensitivity of the eye plotted on the ordinate. The eye is most sensitive vis-a-vis the radiation of the wavelength of 555NM. The sensitivity steadily dropping with smaller and greater wavelengths. For this reason a lighting up of the viewing screen 1 in the green range is deemed to the purpose when the environmental brightness is sufficient.

According to FIG. 2 the viewing screen 1 is composed of a first luminescent layer 3 applied to the front shell 2, a transparent dielectric intermediate layer 4, and a second luminescent layer 5, applied to the latter. The luminescent material layer 3 lights up green and the luminescent material layer 5 lights up red. With a low anode voltage only the luminescent layer 5 will light up. With higher anode voltage both luminescent material layers 3 and 5 will be excited, however, the excitation in the luminescent material layer 3 will be predominant, and the excitation of both the layers 3 and 5 leads to a green lightup. With a higher anode voltage, thus, a green radar image is obtained while with a lower anode voltage a red radar image is obtained. With anode voltages lying therebetween the luminescent material layers 3 and 5 are excited in proportion, so that the luminescent screen 1 radiates an intermediate colour as an overall result, namely orange or yellow when the green layer 3 and the red layer 5 are employed. Other colorations are possible. The luminescent material layers 3 and 5 must have a period of afterglow corresponding to the scanning speed of the electron beam 6.

The electron beam 6 is generated with the aid of the cathode ray tube electrodes which are combined into an electron beam gun 7 in FIG. 2. The deflection is effected through a deflection unit 8 shown in FIG. 2 as a magnetically effective deflection coil. The electron beam gun constructional group 7 and the deflection coil 8 are controlled in the usual manner by an electronic system 9 shown in FIG. 2 in the form of a block only because this is deemed sufficient for the purpose of the description of the present invention.

To effect the change in the anode voltage a photosensitive electronic constructional element 12 may be arranged on the housing 11 surrounding the picture tube 10, the deflection coil 8 and the electronic system 9, said element 12 sensing the environmental brightness of the viewing screen 1 and the output voltage of said element being supplied to the electronic constructional group 9 in order to control the anode voltage it discharges. It is possible in this arrangement to employ circuits in which the anode voltage is steadily reduced with transition from day to night in dependence upon the output voltage of the photosensitive electronic constructional element or which are effective to cause a switching over from a high anode voltage to a low anode voltage at a certain brightness threshold.

A switching arrangement for manual operation is of course also imaginable as schematically represented by the switch 13 in FIG. 2. Here a potentiometer may also be used instead of a simple toggle switch for steadily changing the anode voltage.

With such a multicoloured tube (penetration tube) it is possible to change the coloration of the radar image in a simple manner in order to adapt the representation of the radar image to the changing environmental brightness so that the viewer may view the radar image as clearly as possible and without dazzling.

It is obvious that the invention covers also such multicoloured tubes with which the electrons exiting from the cathode are accelerated not only by an anode but with which there is also provided an after-acceleration by a corresponding electrode configuration with corresponding potentials. The general conception "anode voltage" is meant to cover both embodiments.

If the change in the dimension of the image caused by the change in the acceleration voltage, in particular, in the after-acceleration voltage cannot be tolerated in a particular use of the radar viewing apparatus, it will be to the purpose to balance this change in the dimension of the image by changing the amplification of the sawtooth generator for the generation of the deflection sawtooth. The sawtooth generator is known per se and forms a constituent of the electronic system 9.

I claim:

1. A radar viewing apparatus comprising a cathode ray tube housing an electron beam gun providing an electron beam the characteristics of which are dependent on the voltage applied to the anode of the gun, said cathode ray tube having a viewing screen and a pair of image producing, afterglowing layers luminescing in different colors, said layers luminescing responsive to different anode voltage levels in said electron beam gun; and photosensitive means adjacent said viewing screen responsive to the ambient light surrounding said apparatus, said means being coupled to said electron beam gun for altering the anode voltage of said gun and the color of the image on said screen responsive to ambient light levels.

2. The apparatus in accordance with claim 1 wherein one of said luminescent layers luminesces in a red color and the other of said luminescent layers luminesces in a green color, and wherein said photosensitive means alters the anode voltage of said electron beam gun to provide green screen images for high ambient light levels and orange screen images for low ambient light levels.

3. The radar viewing apparatus in accordance with claim 1 wherein said photosensitive means is further defined as altering the anode voltage of the electron beam gun incrementally.

4. The radar viewing apparatus in accordance with claim 1 wherein said photosensitive means is further defined as altering the anode voltage of the electron beam gun at a uniform rate.

5. The radar viewing apparatus in accordance with claim 1 wherein said cathode ray tube includes a deflection saw tooth wave generator coupled to said electron beam gun and wherein said apparatus includes said means operatively associated with said photosensitive means and said saw tooth wave generator for altering the deflection saw tooth wave to compensate for alterations in the electron beam gun anode voltage.

* * * * *